Feb. 25, 1936.  A. F. BLANCHARD  2,032,197
COMPARATIVE VISCOSITY DEVICE
Filed July 31, 1933   2 Sheets-Sheet 1

INVENTOR:
Adna F. Blanchard,
BY H.S. Woodward,
ATTORNEY.

Feb. 25, 1936.  A. F. BLANCHARD  2,032,197
COMPARATIVE VISCOSITY DEVICE
Filed July 31, 1933  2 Sheets-Sheet 2
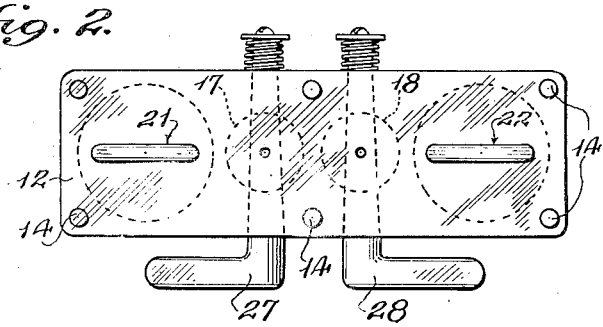
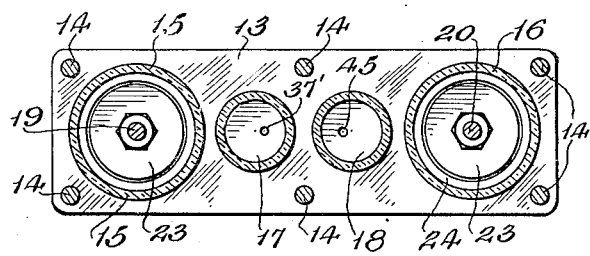
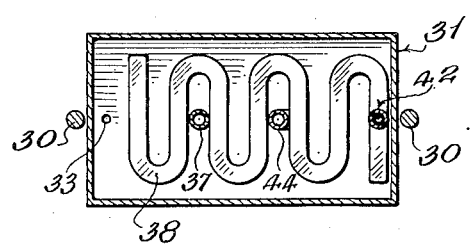
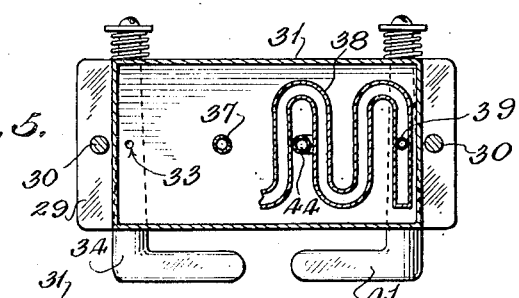
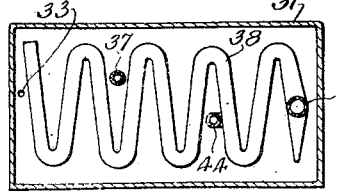
INVENTOR:
Adna F. Blanchard,
BY H. S. Woodward
ATTORNEY.

Patented Feb. 25, 1936

2,032,197

UNITED STATES PATENT OFFICE 2,032,197

COMPARATIVE VISCOSITY DEVICE

Adna F. Blanchard, Providence, R. I., assignor to Tryon Viscostor Corporation, Elmira, N. Y., a corporation of New York Application July 31, 1933, Serial No. 683,061

9 Claims. (Cl. 265—11)

This invention relates to devices for showing comparatively the viscosity of liquids and particularly lubricating oils after use in internal combustion motors, although the invention is applicable to other uses as well.

It is a most important aim to enable the operator of a motor vehicle to be shown accurately, on the instant, the quality of the oil in the crank case of his motor by comparison with an oil of proper viscosity and grade, in a manner to make apparent optically and distinctly any lack of proper viscosity, and presence of sludge or dirt in the oil under test. At the same time an accurate reading of viscosity may be had if desired. While viscosimeters of various kinds have been known, it is an important object of the present invention to remedy some deficiencies of the prior appliances for the uses here contemplated.

One important attainment of the present invention is to enable the rapid charging of the testing device with the two oils to be compared, without difficulty and without tools or apparatus other than my device, so that a motorist may be informed of the condition of the oil in the crank case without leaving his car and without materially delaying his travel.

It is an especially desirable feature of my invention that oil fresh from the motor while hot may be accurately compared with a standard lubricant in such manner that the high temperature of the oil under test will be quickly compensated by the heat transfer to the standard oil of comparison and warm it sufficiently to cause its free flow in cold weather as well as bring about equalization of the temperatures of the two oils.

Additional objects, advantages, and features of invention reside in the construction, arrangement and combination of parts involved, as will appear from the following description and accompanying drawings, wherein Figure 1 is a vertical section taken in the major medial plane of a testing device constructed in accordance with my invention.

Figure 2 is a top view thereof.

Figure 3 is a cross section on the line 3—3 of Figure 1.

Figure 4 is a cross section on the line 4—4 of Figure 1.

Figure 5 is a cross section on the line 5—5 of Figure 1.

Figure 7 is a view similar to Figure 4 showing a preferred form of the convoluted chamber 38.

Figures 1, 6:
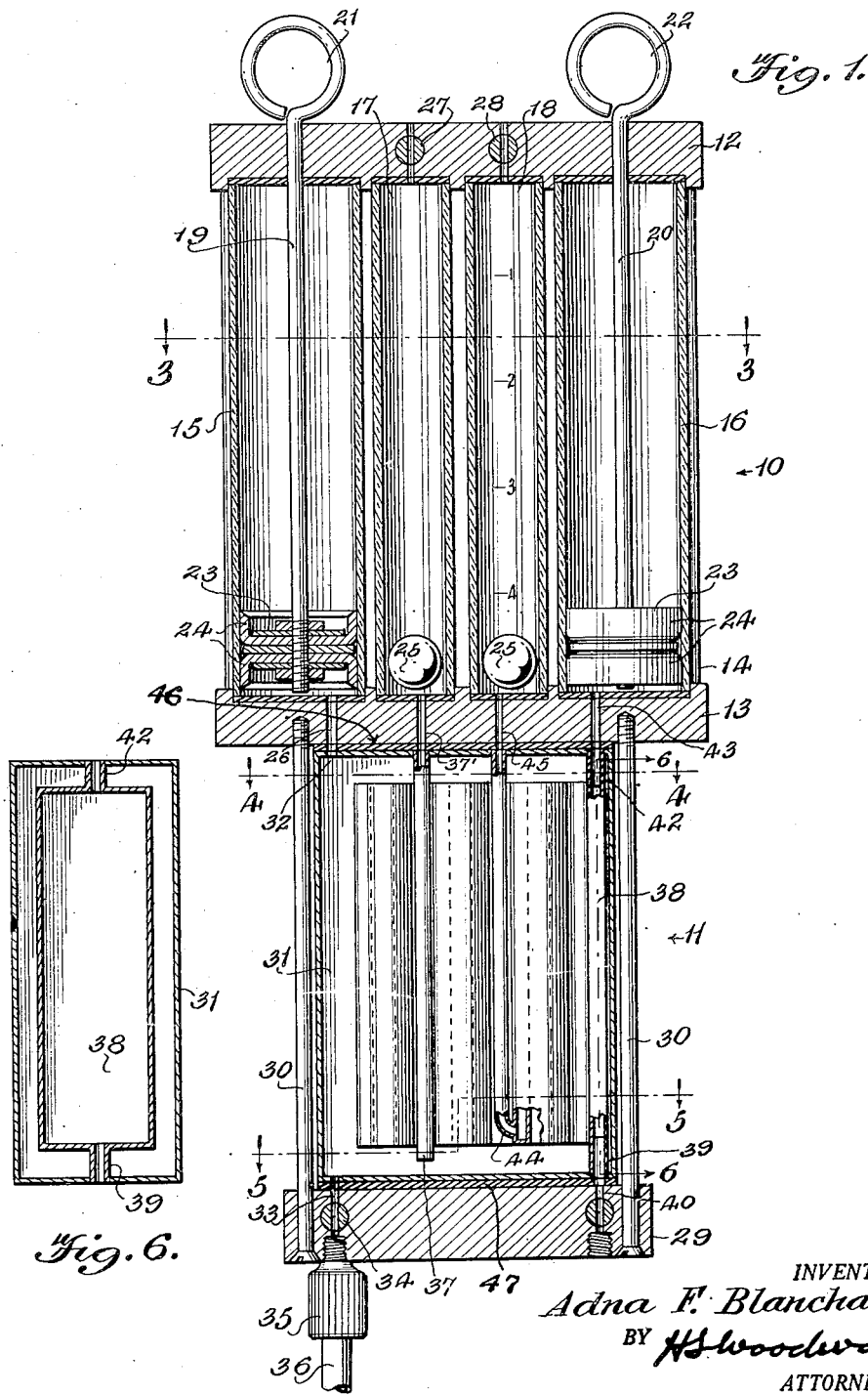
Figure 6 is a fragmentary vertical section of the heat transfer and reservoir section of the device, on line 6—6 of Figure 1.

There is illustrated a testing device comprising an upper operating and display section 10, and a lower intake and reservoir section 11. The section 10 is provided at the top with a head 12 of metal or synthetic gum or other material not affected by the liquids to be tested, and at its lower part a similar middle head 13 is provided. These heads are substantially rectangular in plan and are drawn toward each other by suitable tie rods 14. Between them there are set and clamped with suitable air or liquid tight gaskets two preferably transparent glass pump cylinders 15 and 16 near the ends of the heads 12 and 13, while inwardly of the cylinders two transparent glass tubes 17 and 18 are also similarly clamped between the heads 12 and 13 with proper seals at the ends. These cylinders and tubes are preferably of a glass specially compounded to avoid liability of fracture by unequal heating at different parts, such as "Pyrex", for instance. Through the top head 12 suitable openings are formed concentric with the cylinders through which pump rods 19 and 20 respectively are slidably extended, having operating handles 21—22 at their upper ends and having pump pistons 23 at their lower ends provided with oppositely acting cup washers 24, the pistons being assembled in accordance with familiar practice in pumps. In the tubes 17 and 18 there are disposed balls 25, and the tubes and balls may be proportioned as to size and weight in accordance with established practice in viscosimeters. One or both tubes may have a scale marked thereon, as indicated by the graduation and numerals 1, 2, 3, 4, on the tube 18 and bent openings are formed through the head 12 from each tube, a simple valve or cock being provided in each, having respective handles 27 and 28 beside the head, for manipulation. Openings are formed through the head 13 from each tube and cylinder, said openings from the tubes being arranged off center, so that the balls 25 cannot shut off the flow of oil to the openings when the tubes are being emptied.

A small bottom block 29 is provided, also substantially rectangular in plan and secured to the head 13 by tie screws 30. Between the head 13 and block 29 a rectangular reservoir 31 is held clamped, which may be sealed against the head 13 and block 29 in any suitable way. An exhaust opening 32 is formed through the top of the reservoir to register with the passage 26 to the cylinder 15 and an inlet opening 33 is formed through the bottom of the reservoir and the block 29, a cock 34 for closing the inlet being provided in the block 29, the handle of which is manually operable on the same side with the valve handles 27 and 28. A fitting 35 having a screw threaded or other engagement with the block 29 and which may be a quick detachable conduit fitting, forms a continuation of the opening 33 and may include a flexible hose 36 adapted to be run into the crank case of an automobile engine. From the bottom of the tube 17 an opening 37' placed off center of the tube, is formed through the head 13, communicating with a butted transfer tube 37 extending into the reservoir and opening close to the bottom thereof.

Set in the reservoir in spaced relation to its sides, top and bottom, is a serpentine reservoir chamber or conduit 38 in the form of a flattened tube made of very thin metal, quite narrow horizontally, but of height nearly equal to the height of the reservoir 31. The convolutions are of substantial extent transversely of the reservoir, extend close to its front and rear walls and form a chamber of a capacity of about one-third of that of the reservoir 31. An inlet nipple 39 is connected thereto opening through the bottom of the serpentine chamber at the inside wall of one end and also opening throught the bottom of the reservoir to a passage 40 through the bottom block 29, a cock 41 being provided in this passage having its handle at the front of the device as shown.

An outlet nipple 42 similar to the nipple 39 is engaged with the top of the chamber 38, and reservoir, communicating with the interior of the chamber and a passage 43 through the head 13 to the cylinder 16.

A transfer tube 44 is provided opening into and leading from the bottom of the chamber 38 to the top of the reservoir, where it communicates with an opening 45, through the head 13 to the bottom of the tube 18, this opening being located off center of the tube, to prevent the ball 25 from closing it.

A connection similar to the one 35—36 may be associated with the passage 40, which is enlarged and interiorly threaded at its lower or outer end for the purpose.

In the use of this device, for the purpose of testing the crank case oil of a motor vehicle, as in the case of an automobile which has been stopped for a moment at a service station or the like, the appliance as described being empty and at atmospheric temperature, the operator notes the make and model of the vehicle, for which the proper oil is made known on charts throughout the trade, and having ascertained the grade of oil suitable for the particular motor, the nipple and tube 35—36 being connected to the device at the lower end of the passage 40, the tube is inserted in a container of new oil of that grade, and after closing cock 28 and opening the cock 41, the handle 22 is drawn upwardly. By the vacuum thus created in the pump and chamber new oil is caused to be drawn into the chamber 38, the handle 22 being left in its extended position. The nipple and tube 35—36 are then connected at the lower end of the passage 33 and the tube is inserted through the filler pipe or the oil gauge opening of the crank case of the motor, the cock 27 closed, cock 34 opened and the handle 21 raised slowly. By the vacuum thus created a quantity of the hot crank case oil is drawn into the reservoir 31 surrounding the convolutions of the chamber 38, where it quickly gives up heat, transmitted through the thin metal wall, to the oil in the chamber 38, so that the temperatures of both oils become equalized. The volumetric capacity of the chamber 38 is preferably about one-third the capacity of the reservoir 31 which permits the hot crank case oil to quickly raise the temperature of the new oil and thus facilitates its free flow in cold weather. The cock 34 is now closed by the operator.

The volumetric capacity of the chamber 38 is less than that of the cylinder 16 and the action of the pump is stopped as soon as oil appears in the cylinder as it is desired to only fill the chamber 38. The same is true as to the reservoir and the cylinder 15. The tubes 17—18 are of considerably less volumetric capacity than the reservoir 31 or the chamber 38 as it is imperative to not draw the oil low enough to permit air to enter the tubes 17—18 through the ducts 37—44.

The valves 27—28 are now opened and the handle 22 pressed downward so that the air contents of the cylinder 16 exerts a pressure and causes the displacement of the standard new oil from the bottom of the chamber 38, into the tube 18 until the latter is filled and all air vented. The handle 21 is similarly operated, causing displacement of the crank case oil from the reservoir 31 to the tube 17 until all air is vented therefrom. Both valves 27 and 28 are now closed; and the entire device quickly inverted while the movement of the balls 25 is observed. As soon as either ball reaches the far end of its tube, the appliance is instantly shifted to horizontal position, thereby stopping the motion of the other ball and their relative positions noted, whereby the relative viscosities of the oils will be apparent at once and it may be determined whether or not the crank case oil requires replacement. While the instrument is in horizontal position, pump 15 being at the bottom side, crank case oil from the chamber 31 may be drawn into the pump cylinder for better visibility of its dirt and sludge content.

By utilizing timing of the ball in the tube 18, the viscosity reading of that oil according to accepted tables may be determined.

To restore the appliance to condition for subsequent test of different oils, the instrument is held in upright position, the valves 27 and 28 are opened and the handles 21 and 22 are drawn outward again, which returns the oils, by reason of the vacuum created, to the reservoir 31 and chamber 38 respectively. The valves 27 and 28 being next closed and the valves 34 and 41 opened, the handles 21 and 22 may be pressed downward, and the air pressure thus exerted in the reservoir and chamber expels the oils. They may be returned to their respective sources at the same time by use of two of the nipples and associated tubing, as will be understood.

If desired, the standard oil may be permanently retained in the chamber 38 or tube 17 and only the handle 21 need then be operated when the device is used repeatedly for motors requiring the same standard lubricant. In other words, service stations may have instruments ready loaded with the oils of different viscosities usually required by automobiles, so that the viscosity of any crank case oil may be readily and quickly compared to that of a standard oil by using the particular instrument previously charged with such standard oil in the manner herein described.

The seal between the reservoirs and passages through the head 13 may be a simple sheet gasket 46 of oil proof material, suitably apertured, and a generally similar seal may be provided at the bottom of the reservoir, at 47.

It will be possible by having the apertures through the gaskets 46 and 47 slightly larger than the apertures to be registered therewith to minimize time in assembly and the assembly may be effected by the simple clamping together of the parts 29 and 13 on the reservoir element. Economy in manufacture is thus enhanced. The assembly of the test tubes and the pump cylinders 15—16 is likewise simplified.

By having the convolutions continuously inclined as shown in Figure 7, when emptying the device it may be turned sidewise and oil will drain fully and quickly from the chamber.

I claim:—

1. A device of the character described comprising an upper section having two pumps thereon and two vented observation tubes, a lower section having chambers for a standard and a test liquid respectively, inlet connections to the chambers, a connection between the upper part of each chamber and one of the pumps, a connection between the lower part of each chamber and one of the tubes, and means to close the said inlet connections and vents at will.

2. A device for the purposes described consisting of two cylinders, pistons therein, operating handles for the pistons, two vertical transparent test tubes having vents at their upper ends, means to close the vents at will, two reservoir elements in heat exchange relation, a duct connection between each cylinder and one of the reservoir elements, a duct connection between each tube and one of the reservoir elements, an inlet duct communicating with each reservoir element, and a manually operable valve controlling each of said inlet ducts.

3. The structure of claim 1 in which one of said chambers is defined by a flattened tube of convoluted shape located within the other chamber, the major cross sectional dimension of the tube being vertical, and nearly equal to the height of the other chamber.

4. A device of the character described comprising two vented observation tubes, a ball in each tube, chambers for a standard and a test liquid, respectively, said chambers being arranged in heat exchange relation, an individual inlet connection for each chamber, a connection between the lower part of each chamber and the lower end of a corresponding observation tube and means to exhaust the contents of and to compress air in the chambers individually at will.

5. The structure of claim 4 in which the volumetric capacity of each chamber is greater than that of the observation tube connected therewith.

6. The structure of claim 2 in which the volumetric capacity of at least one cylinder is greater than that of the reservoir element connected therewith and each reservoir element is of greater volumetric capacity than the test tube connected therewith.

7. A device of the character described comprising two transparent test tubes each having a vent at one end, valve means selectively operable to open and close said vents, a movable indicating means in each tube, a pair of reservoirs, one contained within the other and respectively interconnected with the other ends of said tubes, an inlet port for each reservoir, valve means selectively operable to open and close said ports, a pair of pumps, and means connecting one pump with one reservoir and the other pump with the other reservoir whereby the pumps and valve means may be operated in conjunction with each other to fill the reservoirs with fluids and thereafter force said fluids from the reservoirs into the test tubes and through their vents after the tubes are completely filled.

8. A device of the character described comprising two vented observation tubes, a ball movable in each tube, reservoirs for a standard liquid and a liquid to be tested, the former being disposed within the latter, an inlet to each reservoir, control means for each such inlet, an outlet from one reservoir to one tube, an outlet from the other reservoir to the other tube, and a pair of pumps respectively connected with the reservoirs and operable to fill the latter with fluids through said inlets and when the vent control means are open, to thereafter discharge said fluids from each reservoir into the tube therewith connected and from its vent after the tube is completely filled.

9. A device of the class described comprising a heat exchange unit providing separate chambers adapted to contain a fluid to be tested and a standard fluid respectively, a test tube connected with each chamber, a movable testing element in each tube, and means operable to selectively fill the chambers with the respective fluids and to then force the latter from the chambers into the tubes.

ADNA F. BLANCHARD.